(12) United States Patent
Kim et al.

(10) Patent No.: US 10,873,489 B2
(45) Date of Patent: Dec. 22, 2020

(54) METHOD OF TRANSMITTING AND RECEIVING DEVICE-TO-DEVICE UE SIGNAL IN WIRELESS COMMUNICATION SYSTEM AND APPARATUS THEREFOR

(71) Applicant: LG ELECTRONICS INC., Seoul (KR)

(72) Inventors: Kijun Kim, Seoul (KR); Hanbyul Seo, Seoul (KR); Hakseong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/126,973

(22) PCT Filed: Mar. 19, 2015

(86) PCT No.: PCT/KR2015/002687
§ 371 (c)(1),
(2) Date: Sep. 16, 2016

(87) PCT Pub. No.: WO2015/142086
PCT Pub. Date: Sep. 24, 2015

(65) Prior Publication Data
US 2017/0099174 A1 Apr. 6, 2017

Related U.S. Application Data

(60) Provisional application No. 61/955,777, filed on Mar. 19, 2014, provisional application No. 61/983,423, filed on Apr. 23, 2014.

(51) Int. Cl.
*H04L 27/26* (2006.01)
*H04W 76/14* (2018.01)
(Continued)

(52) U.S. Cl.
CPC ...... *H04L 27/2613* (2013.01); *H04L 27/2607* (2013.01); *H04W 76/14* (2018.02); *H04L 5/0051* (2013.01); *H04W 84/042* (2013.01)

(58) Field of Classification Search
None
See application file for complete search history.

(56) References Cited

U.S. PATENT DOCUMENTS

2006/0009227 A1* 1/2006 Cudak ............... H04W 48/08
455/450
2013/0083684 A1 4/2013 Yeh et al.
(Continued)

FOREIGN PATENT DOCUMENTS

| CN | 103037517 | 4/2013 |
|---|---|---|
| EP | 2523378 | 11/2012 |

(Continued)

OTHER PUBLICATIONS

Motorola Mobility, "On Uplink DM-RS and CS hopping Configuration," 3GPP TSG-RAN WG1 #68, R1-121589, Mar. 2012, 3 pages.

(Continued)

*Primary Examiner* — Gregory B Sefcheck
*Assistant Examiner* — Amarnauth G Persaud
(74) *Attorney, Agent, or Firm* — Lee Hong Degerman Kang Waimey

(57) ABSTRACT

According to one embodiment of the present invention, a method of transmitting a D2D (device-to-device) signal, which is transmitted by a user equipment in a wireless communication system, comprising the steps of determining a sequence group, determining a base sequence in the sequence group, generating a reference signal sequence by applying cyclic shift to the base sequence, generating a demodulation reference signal sequence from the reference (Continued)

signal sequence and transmitting a subframe to which the demodulation reference signal sequence is mapped, wherein ID information, which is used for at least one selected from the group consisting of determination of the sequence group, determination of the base sequence and application of the cyclic shift, corresponds to one of an SSID (synchronization ID) and an L1 ID (layer 1 ID) changing according to time.

19 Claims, 6 Drawing Sheets

(51) Int. Cl.
*H04L 5/00* (2006.01)
*H04W 84/04* (2009.01)

(56) References Cited

U.S. PATENT DOCUMENTS

| | | | |
|---|---|---|---|
| 2013/0301452 A1* | 11/2013 | Yoon | H04J 13/0074 370/252 |
| 2014/0016574 A1 | 1/2014 | Seo et al. | |
| 2014/0192756 A1* | 7/2014 | Baldemair | H04L 5/0039 370/329 |
| 2014/0219202 A1* | 8/2014 | Kim | H04W 72/0413 370/329 |
| 2014/0242963 A1* | 8/2014 | Novlan | H04W 48/16 455/418 |
| 2014/0307699 A1* | 10/2014 | Sorrentino | H04L 27/2613 370/329 |
| 2014/0328299 A1* | 11/2014 | Kalhan | H04W 72/0493 370/329 |
| 2015/0078279 A1* | 3/2015 | Ko | H04W 76/14 370/329 |
| 2015/0131551 A1* | 5/2015 | Kakishima | H04L 27/2613 370/329 |
| 2015/0195732 A1* | 7/2015 | Ouchi | H04W 48/16 370/252 |
| 2015/0249979 A1* | 9/2015 | Kim | H04W 76/14 370/329 |
| 2016/0119021 A1* | 4/2016 | Sorrentino | H04L 27/2613 375/138 |
| 2016/0192385 A1* | 6/2016 | Tooher | H04L 5/0051 370/336 |

FOREIGN PATENT DOCUMENTS

| | | |
|---|---|---|
| WO | 2013015653 | 1/2013 |
| WO | 2013020565 | 2/2013 |
| WO | 2013040972 | 3/2013 |
| WO | 2013134891 | 9/2013 |
| WO | 2013154401 | 10/2013 |
| WO | 2013162333 | 10/2013 |

OTHER PUBLICATIONS

PCT International Application No. PCT/KR2015/002687, Written Opinion of the International Searching Authority dated Jul. 17, 2015, 10 pages.
European Patent Office Application Serial No. 15765291.8, Search Report dated Oct. 9, 2017, 8 pages.
Catt, "Details of discovery signal design", 3GPP TSG RAN WG1 Meeting #76, R1-140097, Feb. 2014, 6 pages.
Catt, "Channel scrambling and DMRS design for D2D communication", 3GPP TSG RAN WG1 Meeting #76, R1-140101, Feb. 2014, 2 pages.
LG Electronics et al., "WF on PSSCH DMRS and SA ID", 3GPP TSG RAN WG1 Meeting #85, R1-165676, May 2016, 2 pages.
State Intellectual Property Office of the People's Republic of China Application Serial No. 201580013704.5, Office Action dated Jan. 4, 2019, 22 pages.
Japan Patent Office Application No. 2016-553661, Final Office Action dated Dec. 5, 2019, 3 pages.
LTE; Evolved Universal Terrestrial Radio Access (E-UTRA); Physical channels and modulation (3GPP TS 36.211 version 12.3.0 Release 12); ETSI TS 136 211 V12.3.0; Oct. 2014, 126 pages.
Japan Patent Office Application No. 2016-553661, Office Action dated Oct. 30, 2020, 7 pages.
3rd Generation Partnership Project; Technical Specification Group Radio Access Network; Study on LTE Device to Device Proximity Services; Radio Aspects (Release 12), 3GPP TR 36.843 V1.2.0, Feb. 2014, 13 pages.
3rd Generation Partnership Project; Technical Specification Group Radio Access Network; Evolved Universal Terrestrial Radio Access (E-UTRA); Physical channels and modulation (Release 12), 3GPP TS 36.211 V12.0.0, Dec. 2013, 13 pages.

\* cited by examiner

FIG. 1
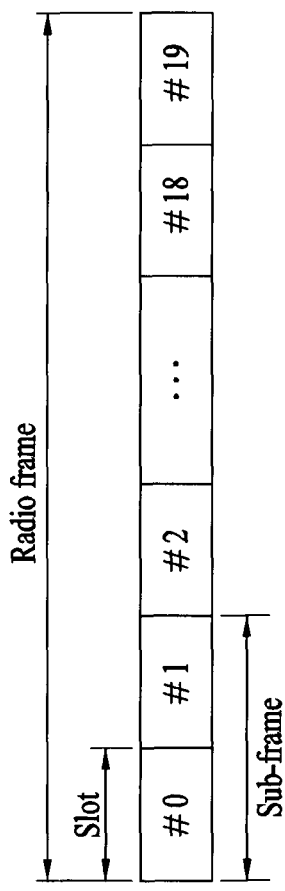
(a)
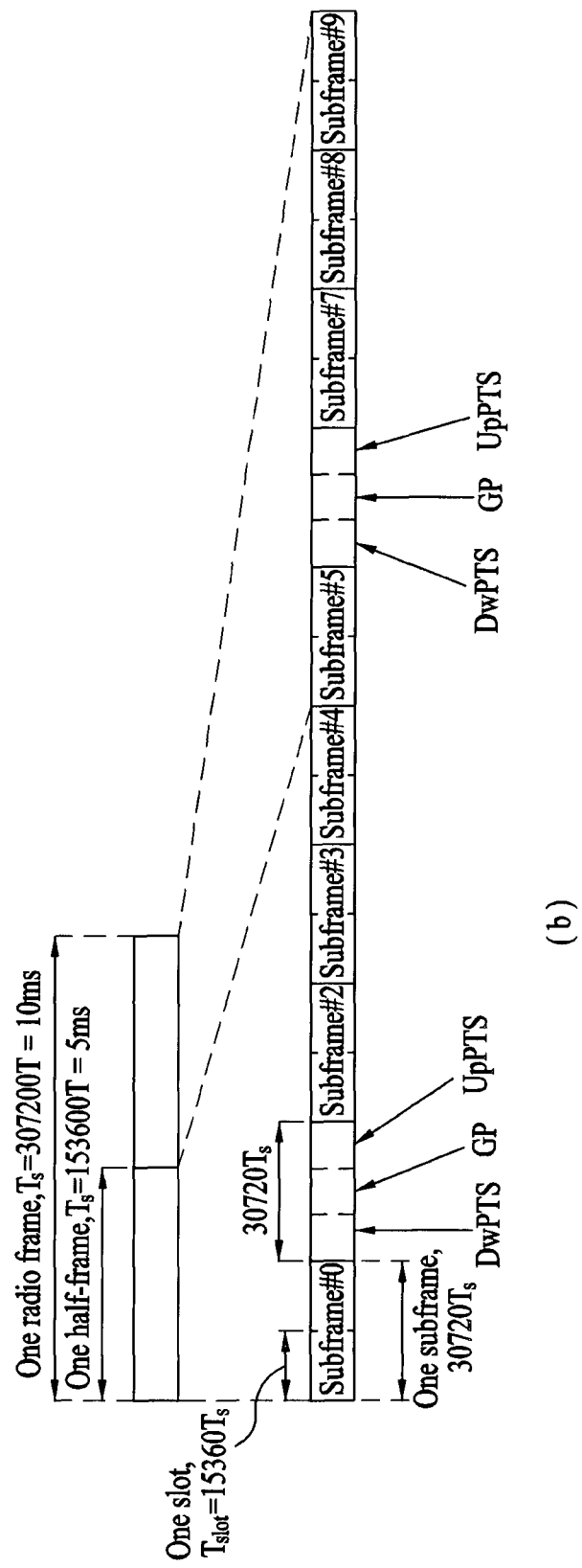
(b)

(a)

(b)

METHOD OF TRANSMITTING AND RECEIVING DEVICE-TO-DEVICE UE SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/002687, filed on Mar. 19, 2015, which claims the benefit of U.S. Provisional Application No. 61/955,777, filed on Mar. 19, 2014, and 61/983,423, filed on Apr. 23, 2014, the contents of which are all hereby incorporated by reference herein in their entirety.

TECHNICAL FIELD

Following description relates to a wireless communication system, more particularly, to a method of transmitting and receiving a signal in a device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may reduce procedures of an eNB, reduce power consumption of devices participating in the D2D, increase data transmission speed, increase network capacity, and enlarge a cell coverage and the like.

Technical Task

A technical task of the present invention is to provide a method of generating a reference signal related to a D2D signal based on an ID changing according to time and a method of transmitting a signal including the reference signal.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to one embodiment of the present invention, a method of transmitting a D2D (device-to-device) signal, which is transmitted by a user equipment in a wireless communication system, comprising the steps of determining a sequence group, determining a base sequence in the sequence group, generating a reference signal sequence by applying cyclic shift to the base sequence, generating a demodulation reference signal sequence from the reference signal sequence and transmitting a subframe to which the demodulation reference signal sequence is mapped, wherein ID information, which is used for at least one selected from the group consisting of determination of the sequence group, determination of the base sequence and application of the cyclic shift, corresponds to one of an SSID (synchronization ID) and an L1 ID (layer 1 ID) changing according to time.

According to a different embodiment of the present invention, a user equipment transmitting a D2D (device-to-device) signal in a wireless communication system, comprising a reception module; and a processor, the processor configured to determine a sequence group, the processor configured to determine a base sequence to be used in the sequence group, the processor configured to generate a reference signal sequence by applying cyclic shift to the base sequence, the processor configured to generate a demodulation reference signal sequence from the reference signal sequence, the processor configured to transmit a subframe to which the demodulation reference signal sequence is mapped, wherein ID information, which is used for determining the sequence group, determining the base sequence or applying the cyclic shift, corresponds to one of an SSID (synchronization ID) and an L1 ID (layer 1 ID) changing according to time.

A slot index, which is used for at least one selected from the group consisting of the determination of the sequence group, the determination of the base sequence and the application of the cyclic shift, is determined based on subframes in which the D2D signal is transmitted only.

The slot index is initialized at a start point of a D2D control channel transmission period.

If the demodulation reference signal is associated with a D2D shared channel and the user equipment corresponds to a in-coverage user equipment, the ID information corresponds to one designated by a eNB among the SSID or the L1 ID.

If the demodulation reference signal is associated with a D2D shared channel and the user equipment corresponds to a out of coverage user equipment, the ID information corresponds to one designated by a user equipment transmitting a synchronization signal among the SSID or the L1 ID.

If the demodulation reference signal is associated with a D2D control channel, the ID information corresponds to the SSID.

The L1 ID is received via a D2D control channel.

If the user equipment corresponds to a out of coverage user equipment, the L1 ID hops in every D2D control channel period.

If group hopping is applied when the sequence group is determined, a the group hopping pattern is determined according to the ID information.

The sequence group is determined by $u=(f_{gh}(n_s)+f_{ss})\mod 30$, wherein if the group hopping is not applied, $f_{gh}(n_s)$ corresponds to 0, wherein if the group hopping is applied, the $f_{gh}(n_s)$ corresponds to $(\Sigma_{i=0}^{7}c(8n_s+i)\cdot 2^i)\mod 30$, wherein $c(i)$ corresponds to a scrambling sequence initialized by $$c_{init} = \left\lfloor \frac{N_{ID}}{30} \right\rfloor + \text{offset},$$

wherein $N_{ID}$ corresponds to the ID information, wherein $f_{ss}$ corresponds to $(N_{ID}+\Delta_{ss})\mod 3$ and wherein $N_{ID}$ corresponds to the ID information $\Delta_{ss}\in\{0, 1, \ldots, 29\}$.

If the reference signal sequence is used for resource blocks equal to or less than 5, the base sequence corresponds to a first sequence of the sequence group.

If the reference signal sequence is used for resource blocks equal to or greater than 6 and sequence hopping is used instead of group hopping, the base sequence is selected according to the ID information.

The base sequence is selected by a scrambling sequence $c(i)$ initialized by $$c_{init} = \left\lfloor \frac{N_{ID}}{30} \right\rfloor \cdot 2^5 + (N_{ID} + \Delta_{ss})\mod 30$$

and wherein $N_{ID}$ corresponds to the ID information $\Delta_{ss}\in\{0, 1, \ldots, 29\}$.

The cyclic shift is determined by a scrambling sequence $c(i)$ initialized by $$c_{init} = \left\lfloor \frac{N_{ID}}{30} \right\rfloor \cdot 2^5 + (N_{ID})\mod 30$$

and wherein $N_{ID}$ corresponds to the ID information.

Advantageous Effects

According to the present invention, collision between D2D UEs can be avoided and efficiency of resource utilization can be enhanced by generating a reference signal using an ID changing according to time.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a diagram for a radio frame structure;

MODE FOR INVENTION

Best Mode for Invention

Figure 2:
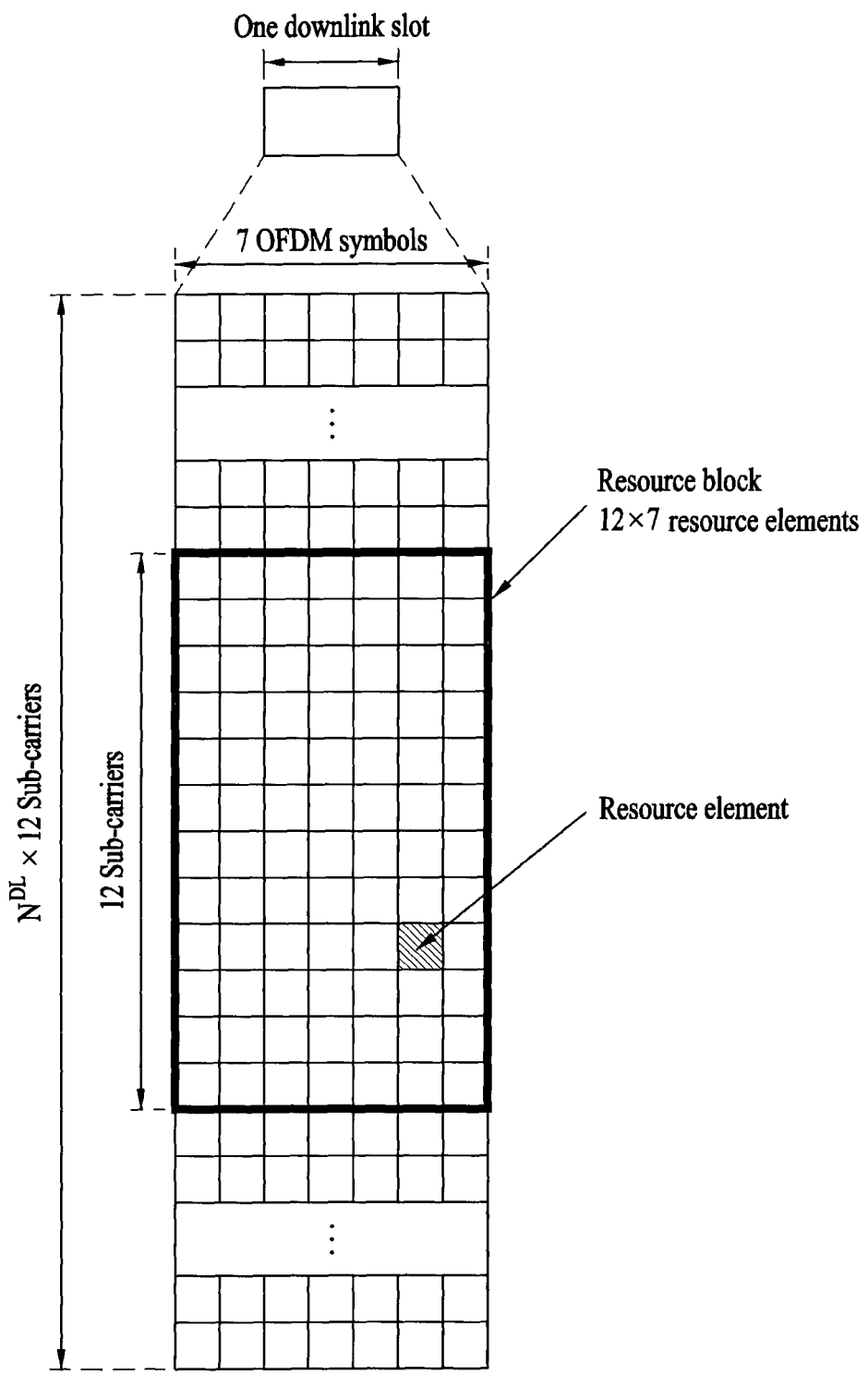
FIG. 2 is a diagram for a resource grid of a downlink slot.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

The base station serves as a terminal node of a network over which the base station directly communicates with the terminal. Specific operations illustrated as being conducted by the base station in this specification may also be conducted by an upper node of the base station, as necessary. In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
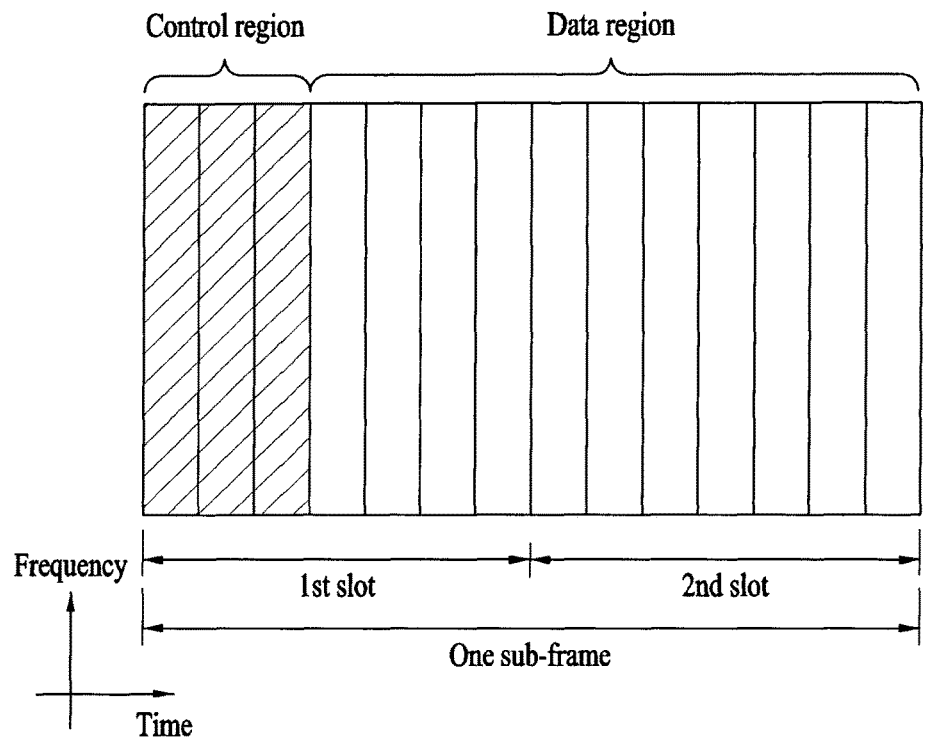
FIG. 3 is a diagram for a structure of a downlink subframe.
Figure 4:
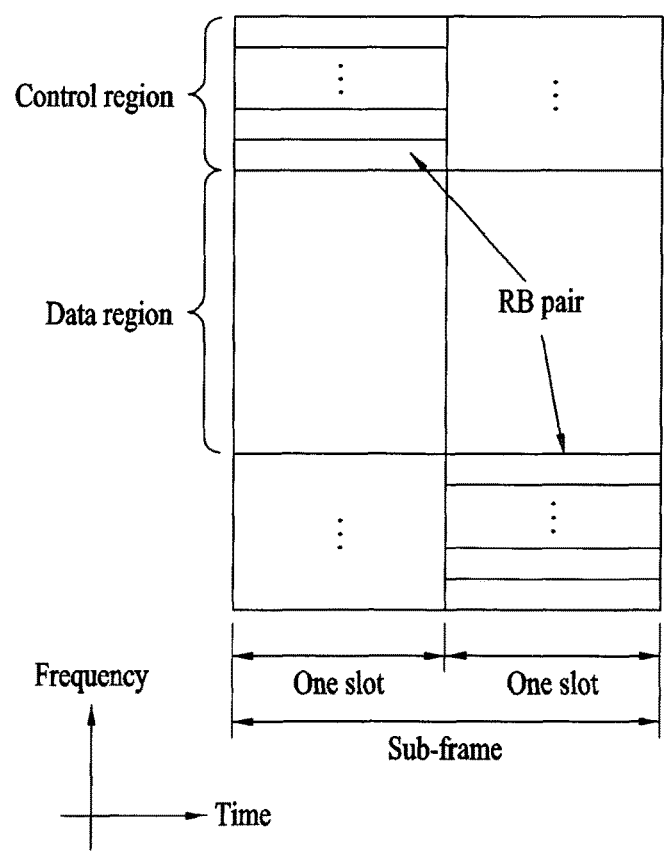
FIG. 4 is a diagram for a structure of an uplink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI). FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

In the following, synchronization acquisition between UEs in D2D communication is explained based on the aforementioned description and a legacy LTE/LTE-A system. If time/frequency synchronization is not matched with each other in OFDM system, it may be difficult to perform multiplexing between UEs different from each other in an OFDM signal due to inter-tone interference. For the synchronization, if D2D UEs directly transmit and receive a synchronization signal from each other and each of the UEs individually matches synchronization, it is inefficient. Hence, in a distributed node system such as D2D, a specific node transmits a representative synchronization signal and the rest of UEs can match synchronization with the representative synchronization signal. In other word, in order to transmit and receive a D2D signal, a part of nodes (in this case, a node may corresponds to an eNB, a UE or an SRN (synchronization reference node or also called synchronization source)) transmits a D2D synchronization signal (D2DSS) and the rest of UEs may match synchronization with the D2D synchronization signal to transmit and receive a signal.

A D2D synchronization signal can be classified into a PD2DSS (primary D2DSS) and an SD2DSS (secondary D2DSS). The PD2DSS may correspond to a Zadoff-chu sequence of a prescribed length or a similar/transformed/repeated structure of a PSS. The SD2DSS may correspond to an M-sequence or a similar/transformed/repeated structure of an SSS. If UEs match synchronization with an eNB, an SRN becomes the eNB and a D2DSS becomes a PSS/SSS. A PD2DSCH (physical D2D synchronization channel) may correspond to a (broadcast) channel on which basic (system) information (e.g., D2DSS-related information, duplex mode (DM), TDD UL/DL configuration, resource pool-related information, a type of D2DSS-related application, and the like), which should be firstly known to a UE before a D2D signal is transmitted and received, is transmitted. The PD2DSCH can be transmitted in a subframe identical to a subframe of a D2DSS or a subframe appearing after the subframe of the D2DSS.

An SRN may correspond to a node transmitting a D2DSS and a PD2DSCH (physical D2D synchronization channel). The D2DSS may have a form of a specific sequence and the PD2DSCH may have a form of a sequence indicating specific information or a form of a codeword of which a predetermined channel coding is underwent. In this case, an eNB or a specific D2D UE may become the SRN. In case of partial network coverage or out of network coverage, a UE may become the SRN. In case of inter-cell discovery, in order to make UEs of an adjacent cell know timing, the UEs may be able to relay a D2DSS at a timing of the UEs received from the SRN to which schedule offset is added. In particular, the D2DSS can be relayed via multiple hops. If a plurality of UEs relay the D2DSS or if there exist a plurality of clusters in the vicinity of a UE, the UE receiving the D2DSS can find out a plurality of D2DSSs and receive a D2DSS including hops different from each other.

In the following, a method of determining a DMRS sequence index and a DMRS CS index or a (data) scrambling sequence, which is to be used on a D2D data channel when performing D2D communication, based on a D2D UE identity and a method of changing the D2D UE identity according to time are explained. In this case, the sequence index of the DMRS can include ID information (specifically, ID information used for initializing a pseudo random sequence when a group hopping pattern is determined) used for determining a sequence group in the course of generating the DMRS and ID information used for determining a base sequence to be used by the sequence group. The CS index can include ID information used for applying cyclic shift to a base sequence in the course of generating the DMRS. The (data) scrambling sequence may correspond to a pseudo random sequence used for scrambling a signal transmitted on a D2D shared channel.

Figure 5:
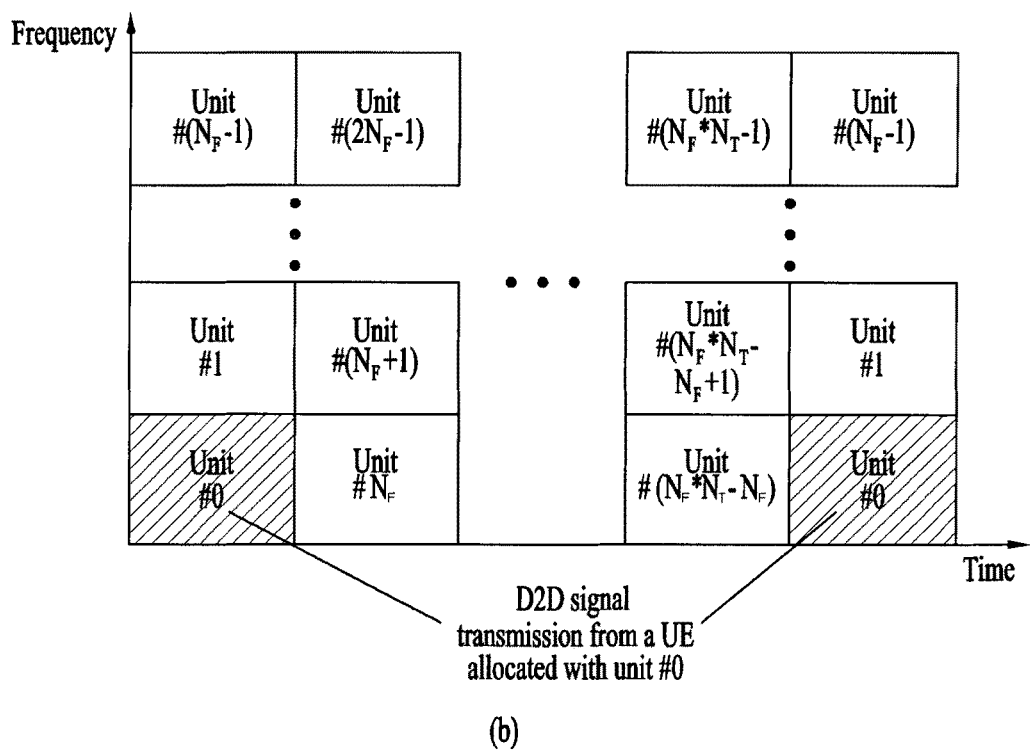
FIGS. 5 to 6 are diagrams for explaining a method of transmitting and receiving a D2D signal according to one embodiment of the present invention.

FIG. 5 shows an example of D2D communication environment and a resource pool/unit to which an embodiment of the present invention is applicable. Yet, this is an example only to help understand the present invention. Explanation on the present invention described in the following is not limited by FIG. 5. Under this premise, referring to FIG. 5, FIG. 5 (*a*) shows D2D communication performed by a UE1 and a UE2. In this case, a UE refers to a terminal of a user. Yet, if such a network device as an eNB transmits and receives a signal according to a communication scheme between UEs, the network device can also be considered as a UE. In the following, the UE1 can select a resource unit corresponding to a specific resource from a resource pool corresponding to a series of resource sets and may be able to transmit and receive a D2D signal using the resource unit. On the contrary, the resource pool to which a signal of the UE1 is transmittable is set to the UE2, which is a reception UE, and the UE2 can detect the signal of the UE1 in the pool. In this case, if the UE1 is positioned within a connection range of an eNB, the eNB can inform the UE1 of the resource pool. If the UE1 is positioned at the outside of the connection range, a other UE may inform the UE1 of the resource pool. Or, the resource pool can be determined by a predetermined resource. In general, the resource pool consists of a plurality of resource units and each UE selects one or a plurality of resource units from the resource pool and can use the selected resource unit(s) to transmit a D2D signal of the UE.

FIG. 5 (*b*) shows an example of configuring a resource unit. The example corresponds to a case of defining total $N_F*N_T$ number of resource units in a manner that total frequency resources are divided into $N_F$ number of frequency resources and total time resources are divided into $N_T$ number of time resources. In this case, a corresponding resource pool is repeated with a period of $N_T$ subframe. In particular, as shown in the drawing, a single resource unit may repeatedly and periodically appear. Or, in order to obtain diversity effect in time or frequency domain, an index of a physical resource unit to which a logical resource unit is mapped may change into a predetermined pattern according to time. In this resource unit structure, a resource pool may indicate a set of resource units capable of being used by a UE intending to transmit a D2D signal.

The resource pool can be distinguished from each other according to content of D2D signals transmitted from each resource pool. For instance, a separate resource pool can be configured for a D2D control channel (e.g., scheduling assignment (SA), a D2D shared channel (e.g., D2D data channel) and a D2D discovery channel (e.g., discovery message), respectively. In this case, the SA may correspond to a signal including information on a resource position used for each transmission UE to transmit a following D2D data channel, information on an MCS (modulation and coding scheme) necessary for demodulating other data channels and information on MIMO transmission scheme and the like. This signal can be transmitted in a manner of being multiplexed with D2D data in an identical resource unit. In this case, an SA resource pool may correspond to a resource pool in which the SA is transmitted in a manner of being multiplexed with D2D data. A D2D data channel may correspond to a user data transmitted by a transmission UE using a resource designated via the SA. If SA information and D2D data are capable of being transmitted in an identical resource unit in a manner of being multiplexed together, the resource pool for D2D data channel may have a form that a D2D data channel from which the SA information is excluded is transmitted only. A discovery message may correspond to a message enabling an adjacent UE to discover a transmission UE in a manner that the transmission UE transmits such information as an ID and the like of the transmission UE.

Figure 6:
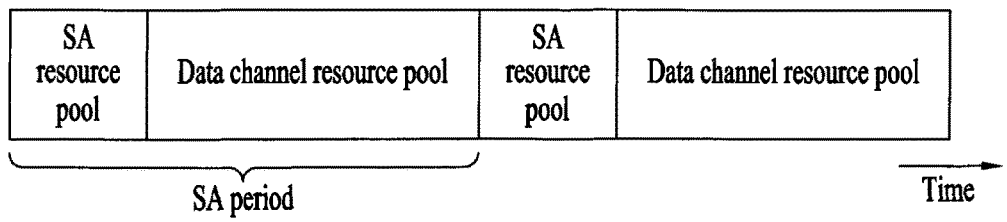

A UE intending to transmit data via D2D communication selects an appropriate resource from a pool of SA resources and may be then able to transmit SA of the UE. In this case, in case of selecting an SA resource, it may preferentially consider a resource in which SA of a other UE is not transmitted and/or an SA resource interlocked with a resource in which data transmission in a following subframe according to SA of a other UE is not expected. Or, the UE may select an SA resource interlocked with a data transmission resource in which an interference level is expected to be low. FIG. 6 shows an example of an SA resource pool and a data channel resource pool appears after the SA resource pool. As shown in FIG. 6, the SA resource pool and the data channel resource pool are defined by a single SA period and can be repeated in time axis.

In case of a D2D SA channel, since a transmission UE selects an appropriate resource from an SA resource pool for transmitting, a reception UE should perform blind detection on all resource units belonging to the SA resource pool to find out whether the D2D SA channel is transmitted. In order to reduce blind detection per resource unit of the SA resource pool, it may be preferable to fix a sequence index of a DMRS and a cyclic shift (CS) index used on the D2D SA channel. Or, it may be preferable to use a limited set only. More specifically, if two UEs select an identical SA resource unit at the same time and transmit a D2D SA channel, interference may occur between the two UEs. Although two signals select an identical SA resource unit, if the two signals use a DMRS sequence or a scrambling sequence different from each other, interference between the two signals is randomized and impact of the interference can be minimized. Yet, if the two signals use an identical SA resource unit and the two signals are transmitted using an identical DMRS sequence and a scrambling sequence, interference between the two signals is maximized. Hence, although there exists a huge difference between the two signals in a reception level, it may be difficult to properly decode even a signal of a strong reception level. Hence, since complexity due to blind detection of a UE and interference randomizing effect between D2D SA channels are in a trade-off relation, it is necessary to appropriately determine the number of DMRS sequences N and the number of scrambling sequences M usable on the D2D SA channel in consideration of the trade-off relation.

A sequence index set of DMRS usable on a D2D SA channel can be determined by an ID (identity) of an SS (synchronization source). In this case, the SS may correspond to a source device transmitting synchronization signals such as a D2DSS, a D2DBCH and the like and providing a criterion for determining transmission time of the D2D SA channel. In case of an in-coverage situation of a cellular system, an SSID may be identical to a cell ID. On the contrary, in case of an out of coverage situation, an SSID may be identical to a D2D cluster ID. And, channel encoding is performed on information transmitted on an SA channel, encoded bits are scrambled by a scrambling sequence for randomizing and encryption, and scrambled encoded bits are transmitted in a manner of being modulated by a suitable modulation scheme. In this case, a limited set can be used only for the scrambling sequence to reduce blind detection of a reception UE. In particular, the scrambling sequence is fixed in a manner of being connected with a sequence index and a CS index of DMRS or a limited set can be used for the scrambling sequence. If there are M number of available scrambling sequences per DMRS sequence capable of being transmitted in a resource unit of an SA resource pool, since a UE performs descrambling and decoding using each of the M number of scrambling sequences, the UE performs total M number of decoding.

On the contrary, since a transmission parameter of a D2D data channel is informed via an SA channel, it is not necessary to consider blind detection complexity. Hence, in order to increase interference randomization, the number of DMRS sequences or scrambling sequences greater than the number of DMRS sequences or scrambling sequences used on a D2D SA channel can be used on the D2D data channel. Information delivered by the D2D SA channel can include information on a resource unit to which a D2D data channel is transmitted by a UE among a following data resource pool, information on a sequence index and a CS index of DMRS of a data channel and information on a scrambling sequence used for the data channel. The sequence index and the CS index of DMRS and the scrambling sequence index, which are to be used on a following D2D data channel, can be directly informed by the information transmitted on the D2D SA channel Or, if D2D UE identity is included in transmission information of the D2D SA channel, a DMRS sequence index and a DMRS CS index and a (data) scrambling sequence, which are to be used on a D2D data channel, can be determined by the D2D UE identity.

In the following, a method of transmitting a D2D signal according to embodiment of the present invention is explained in a manner of more specifying the aforementioned description.

A D2D UE determines a sequence group (or sequence group index u) and can determine a base sequence ($\bar{r}_{u,v}(n)$) to be used in the sequence group. Subsequently, the D2D UE generates a reference signal sequence ($r_{(u,v)}^{(\alpha)}(n)$) by applying cyclic shift to the base sequence and can generate a demodulation reference signal sequence (DMRS) based on the reference signal sequence. Subsequently, the D2D UE maps the DMRS sequence to a resource element and can transmit a subframe to which the DMRS sequence is mapped.

In this case, ID information, which is used for at least one selected from the group consisting of determination of a sequence group, determination of the base sequence and application of cyclic shift, may correspond to one of an SSID (synchronization ID) and an L1 ID (layer 1 ID). The L1 ID may be changed according to time variance. And, a slot index ($n_s$), which is used for at least one selected from the group consisting of determination of the sequence group, determination of the base sequence and application of the cyclic shift, may correspond an index determined based on subframes in which a D2D signal is transmitted only.

The DMRS generated according to the aforementioned description may be associated with a D2D shared channel or a D2D control channel. If the DMRS is associated with the D2D control channel, ID information may correspond to an SSID. In particular, a DMRS sequence index and a CS index of a D2D SA channel can be determined by the SSID. In case of an in-coverage situation, the SSID may be identical to a physical cell ID or can be designated by an eNB. The SSID designated by the eNB can be called a virtual cell ID or a D2D cluster ID. In case of an out of coverage situation, the SSID can be determined by a UE transmitting an independent synchronization signal.

If a DMRS is associated with a D2D shared channel, it is able to select an SSID or an L1 ID (or SA ID) to determine a DMRS sequence index and a CS index of a D2D data channel. If a network properly performs radio resource management in the in-coverage situation, it may use a scheme of determining the DMRS sequence index and the CS index of the D2D data channel by all UEs using a common SSID to efficiently control interference. On the contrary, if the network performs the radio resource management by a randomization principle in the in-coverage situation, it may use a scheme of determining the DMRS sequence index and the CS index of the D2D data channel by all UEs using an L1 ID different from each other to efficiently randomize interference. Hence, an eNB designates whether the DMRS sequence index and the CS index of the D2D data channel are determined using the SSID or the L1 ID and informs the D2D UE of the in-coverage situation of a result of the designation. In particular, if a demodulation reference signal is associated with a D2D shared channel and the UE corresponds to a UE located within coverage (in-coverage UE), the ID information may correspond to one designated by the eNB among the SSID and the L1 ID. In case of the out of coverage situation, a UE transmitting an independent SS according to a D2D cluster designates whether the DMRS sequence index and the CS index of the D2D data channel are determined using the SSID or the L1 ID and informs the D2D UE of a result of the designation. In particular, if a demodulation reference signal is associated with a D2D shared channel and the UE corresponds to a UE located at the outside of coverage (out of coverage UE), the ID information may correspond to one designated by a UE transmitting a synchronization signal among the SSID and the L1 ID. Or, it may be able to configure the DMRS sequence index and the CS index of the D2D data channel to be determined using the L1 ID in a D2D cluster in advance in case of the out of coverage situation.

Each step of generating the aforementioned DMRS is explained in more detail. A sequence group can be determined by Formula 1 in the following.

$$u=(f_{gh}(n_s)+f_{ss})\bmod 30 \quad \text{[Formula 1]}$$

In this case, if group hopping is not applied, $f_{gh}(n_s)$ corresponds to 0. If group hopping is applied, $f_{gh}(n_s)$ corresponds to $(\sum_{i=0}^{7} c(8n_s+i)\cdot 2^i)\bmod 30$. c(i) corresponds to a scrambling sequence (pseudo random sequence) initialized by $$c_{init} = \left\lfloor \frac{N_{ID}}{30} \right\rfloor + \text{offset}$$

and $N_{ID}$ corresponds to the ID information. A sequence shift pattern $f_{ss}$ corresponds to $(N_{ID}+\Delta ss)\bmod 30$ and is determined as $\Delta_{ss} \in \{0, 1, \ldots, 29\}$ by upper layer signaling. offset can be configured in advance or can be indicated by a synchronization source. There may exist Y number of sequence hopping patterns and 30 sequence shift patterns different from each other. And, whether to apply sequence group hopping can be indicated by a parameter provided by a synchronization source.

$N_{ID}$ corresponds to the ID information, which is used for at least one selected from the group consisting of determination of a sequence group, determination of the base sequence and application of cyclic shift. The $N_{ID}$ may correspond to one of an SSID (synchronization ID) and an L1 ID (layer 1 ID). The L1 ID may be changed according to time variance. For instance, the $N_{ID}$ may be able to designate that the SSID is used in case of transmitting an SA channel. The $N_{ID}$ may also be able to designate whether to use the SSID or the D2D L1 ID in case of transmitting a D2D data channel. And, $n_s$ indicates a transmission slot index. A slot index can be indexed using D2D transmission subframes only. The $n_s$ can be initialized at a start timing of an SA transmission period. As a transformed scheme, an eNB or an ISS (independent synchronization source) UE designates $N_{ID}$ to be used for sequence-group hopping and may be able to inform D2D UEs in a D2D cluster of the designated $N_{ID}$. In this case, $N_{ID}$ to be used when transmitting an SA channel and $N_{ID}$ to be used when transmitting a D2D data channel can be individually designated and informed. In this case, the $N_{ID}$ may correspond to the third ID different from the SSID and the D2D L1 ID. This corresponds to a case that a plurality of D2D clusters perform cooperative resource management using identical sequence group hopping. In this case, a D2D cluster corresponds to coverage of a single eNB of an in-coverage situation.

Subsequently, a base sequence ($\bar{r}_{u,v}(n)$) can be selected from the determined sequence group. If a reference signal sequence is used for resource blocks equal to or less than 5 (i.e., $M_{sc}^{RS} \leq 5 N_{sc}^{RB}$, $M_{sc}^{RB}$ corresponds to a length of a reference signal sequence and $N_{sc}^{RB}$ corresponds to the number of subcarriers of RB), the base sequence can be determined as a first sequence of the sequence group. If a reference signal sequence is used for resource blocks equal to or greater than 6 ($M_{sc}^{RS} \geq 6 N_{sc}^{RB}$), the base sequence can be determined by Formula 2 in the following. In particular, if a reference signal sequence is used for resource blocks equal to or greater than 6 and sequence hopping is used instead of group hopping, the base sequence can be selected according to the ID information.

$$v = \begin{cases} c(n_s) & \text{if group is disabled and} \\ & \text{sequence hopping is enabled} \\ 0 & \text{otherwise} \end{cases} \quad \text{[Formula 2]}$$

In this case, c(i) corresponds to a scrambling sequence (pseudo random sequence) initialized by $$c_{init} = \left\lfloor \frac{N_{ID}}{30} \right\rfloor \cdot 2^5 + (N_{ID}) \bmod 30$$

(at each radio frame or a start of an SA period) and $N_{ID}$ corresponds to the ID information. The $N_{ID}$ is determined as $\Delta_{ss} \in \{0, 1, \ldots, 29\}$ by upper layer signaling.

The $N_{ID}$ corresponds to the ID information used for at least one selected from the group consisting of determination of a sequence group, determination of the base sequence and application of cyclic prefix. The $N_{ID}$ may correspond to one of an SSID and an L1 ID (layer 1 ID). The L1 ID may be changed according to time variance. For instance, the $N_{ID}$ may be able to designate that the SSID is used in case of transmitting an SA channel. The $N_{ID}$ may also be able to designate whether to use the SSID or the D2D L1 ID in case of transmitting a D2D data channel And, $n_s$ indicates a transmission slot index. A slot index can be indexed using D2D transmission subframes only. The $n_s$ can be initialized at a start timing of an SA transmission period. As a transformed scheme, an eNB or an ISS (independent synchronization source) UE designates $N_{ID}$ to be used for sequence-group hopping and may be able to inform D2D UEs in a D2D cluster of the designated $N_{ID}$. In this case, $N_{ID}$ to be used when transmitting an SA channel and $N_{ID}$ to be used when transmitting a D2D data channel can be individually designated and informed. In this case, the $N_{ID}$ may correspond to the third ID different from the SSID and the D2D L1 ID. This corresponds to a case that a plurality of D2D clusters perform cooperative resource management using identical sequence group hopping.

A reference signal sequence $(r_{(u,v)}^{(\alpha)}(n))$ can be generated by applying cyclic shift to the determined base sequence ($\bar{r}_{u,v}(n)$). More specifically, in a slot $n_s$, $\alpha$ corresponds to $2\pi n_{cs}/12$ and it may be represented as $n_{cs} = (n_{DMRS}^{(1)} + n_{DMRS}^{(2)} + n_{PRS}(n_s)) \bmod 12$. $n_{DMRS}^{(1)}$ corresponds to a parameter provided by a synchronization source and $n_{DMRS}^{(2)}$ corresponds to a value given by cyclic shift for DMRS in latest control information within an SA channel related to corresponding data channel transmission. $n_{PRS}(n_s)$ is determined by Formula 3 in the following.

$$n_{PRS}(n_s) = \sum_{i=0}^{7} c(8N_{symb}^{UL} \cdot n_s + i) \cdot 2^i \quad \text{[Formula 3]}$$

In this case, c(i) corresponds to a scrambling sequence (pseudo random sequence) initialized by $$c_{init} = \left\lfloor \frac{N_{ID}}{30} \right\rfloor \cdot 2^5 + (N_{ID}) \bmod 30$$

(at each radio frame or a start of an SA period) and $N_{ID}$ corresponds to the ID information.

The $N_{ID}$ corresponds to the ID information used for at least one selected from the group consisting of determination of a sequence group, determination of the base sequence and application of cyclic prefix. The $N_{ID}$ may correspond to one of an SSID and an L1 ID (layer 1 ID). The L1 ID may be changed according to time variance. For instance, the $N_{ID}$ may be able to designate that the SSID is used in case of transmitting an SA channel. The $N_{ID}$ may also be able to designate whether to use the SSID or the D2D L1 ID in case of transmitting a D2D data channel And, $n_s$ indicates a transmission slot index. A slot index can be indexed using D2D transmission subframes only. The $n_s$ can be initialized at a start timing of an SA transmission period. As a transformed scheme, an eNB or an ISS (independent synchronization source) UE designates $N_{ID}$ to be used for sequence-group hopping and may be able to inform D2D UEs located within a D2D cluster of the designated $N_{ID}$. In this case, $N_{ID}$ to be used when transmitting an SA channel and $N_{ID}$ to be used when transmitting a D2D data channel can be individually designated and informed. In this case, the $N_{ID}$ may correspond to the third ID different from the SSID and the D2D L1 ID. And, $N_{ID}$ for cyclic shift hopping can be differently designated from an ID for sequence group hopping and an ID for sequence hopping. The $N_{ID}$ for cyclic shift hopping is differently designated to efficiently cope with a case that a plurality of D2D clusters perform cooperative resource management using identical cyclic shift hopping.

In the foregoing description, in relation to transmission resource hopping, DMRS sequence hopping and CS hopping of a D2D data channel, it may be able to indicate whether a common hopping pattern is used by all UEs of a D2D cluster or an individual hopping pattern is used according to a UE. A process of generating a DMRS sequence from a reference signal sequence and a method of mapping a DMRS sequence to a resource element can be referred by 3GPP TS 36.211 V12.3.0, Technical Specification and the like, unless otherwise noted.

Figure 7:
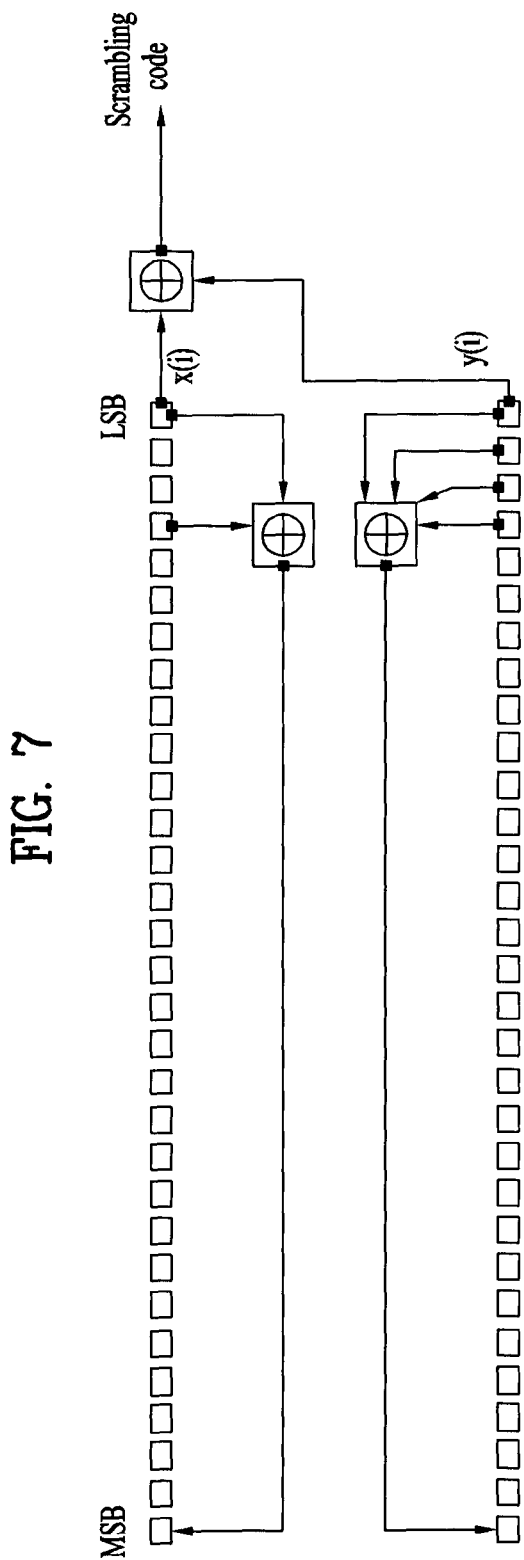
FIG. 7 is a diagram for a sequence generator usable in one embodiment of the present invention.

As mentioned in the foregoing description, a DMRS sequence index and a DMRS CS index or a (data) scrambling sequence can be determined by an ID of a D2D UE. In this case, the ID can change/hop according to time. The ID may correspond to an ID defined by an AL (application layer) of 40 bits and more. In this case, a DMRS sequence index and a DMRS CS index or a (data) scrambling sequence, which is to be used on a D2D data channel, can be determined by D2D UE ID and a D2D subframe index. On the contrary, an L1 ID (e.g., less than 16 bits) of a D2D UE is determined by an AL ID included in information delivered by a D2D SA channel. A DMRS sequence index and a DMRS CS index or a (data) scrambling index, which is to be used on a following D2D data channel, can be determined by an L1 ID of a D2D UE and a D2D subframe index. In this case, mapping to the D2D UE L1 ID from the AL ID may change according to time. Hence, although UE's having different AL ID's momentarily select an identical L1 ID, the UE's may use different L1 ID's at a next time to avoid collision. A scrambling sequence can be generated by a scrambling sequence generator shown in FIG. 7. The scrambling sequence generator of FIG. 7 determines a sequence generated according to an initial value configuration of 31 bits. If an initial value is determined by an AL ID of 40 bits, the initial value can be determined by a function of the AL ID and D2D data channel transmission time. By doing so, initial value configuration of a UE can change on every D2D data channel transmission time.

If the number of bits permitted to ID delivery delivered via an SA channel is small (e.g., less than 16 bits and the like), an L1 ID less than 16 bits can be informed only via the SA channel. A UE can transmit a D2D data channel using a DMRS sequence index, a DMRS CS index or a (data) scrambling sequence determined by the L1 ID and a subframe index. An AL ID can be delivered via a message, which is transmitted via a data channel more than one time in a D2D data channel transmission period. Having received the message, the UE can identify a change of an L1 ID of the transmission UE using a function of the AL ID and a channel transmission time index. Hence, it is able to know a new L1 ID to be used by the UE in a next SA transmission period. As mentioned in the foregoing description, the L1 ID changes in every SA transmission period. In particular, an L1 ID informed by a specific UE on an SA channel transmitted in an $i^{th}$ SA transmission period is different from an L1 ID informed on an SA channel transmitted in an $(i+1)^{th}$ SA transmission period. A scheme of changing an L1 ID of a specific UE is informed via a data channel in every data transmission period. As a different example, an L1 ID may change in every W number of SA transmission periods. In particular, an L1 ID informed by a specific UE on an SA channel transmitted in an $i^{th}$ SA transmission period is different from an L1 ID informed on an SA channel transmitted in an $(i+W)^{th}$ SA transmission period. A scheme of changing an L1 ID of a specific UE can be informed via a data channel in every W number of data transmission periods. If an identical L1 ID is used from a $(W*i)^{th}$ SA transmission period to a $(W*(i+1)-1)^{th}$ SA transmission period, a scheme of changing an L1 ID of a corresponding UE can be informed more than one time via a data channel from a $(W*i)^{th}$ SA transmission period to a $(W*(i+1)-1)^{th}$ SA transmission period. As a different example, a message notifying an AL ID is included in a data, which is delivered on a data channel in every data transmission period. Information on a resource unit, which is to be used in a next data transmission period, can be included in the message. In this case, although a reception UE does not receive SA to receive a next data transmission period, the reception UE can receive a D2D data channel.

The aforementioned method of determining an ID and signal transmission related to the method can be performed by an order as follows. An AL ID of a UE can be transmitted on a D2D SA channel. In this case, an L1 ID can change according to time by a function of the AL ID of the UE and a channel transmission time index. A DMRS sequence index, a DMRS CS index or a (data) scrambling sequence is determined using a determined L1 ID and a subframe index and a D2D data channel can be transmitted using the DMRS sequence, the DMRS CS index or the (data) scrambling sequence. As a different example, an L1 ID of a UE can be transmitted via a D2D SA channel A D2D data channel can be transmitted using a DMRS sequence index, a DMRS CS index or a scrambling sequence determined by the L1 ID and a subframe index. A hopping pattern of the L1 ID can be informed by a message which is transmitted on a data channel more than one time during a D2D data channel transmission period. The L1 ID can be changed according to time using a function of the AL ID of the UE. In particular, the L1 ID can be determined using a function of the AL ID of the UE and a channel transmission index. It is able to induce a new L1 ID, which is to be used by the UE, from a next SA transmission period. And, a D2D SA channel of the new L1 ID is transmitted in the next SA transmission period. As a further different example, an L1 ID of a UE can be transmitted via a D2D SA channel A D2D data channel can be transmitted using a DMRS sequence index, a DMRS CS index or a scrambling sequence determined by the L1 ID and a subframe index. A hopping pattern of the L1 ID can be informed by a message which is transmitted on a data channel more than one time during a D2D data channel transmission period. The L1 ID can be changed according to time using a function of the AL ID of the UE. In particular, the L1 ID can be determined using a function of the AL ID of the UE and a channel transmission index. It is able to induce a new L1 ID, which is to be used by the UE, from a next SA transmission period. A message, which is transmitted on a data channel more than one time during a D2D data channel transmission period, can indicate a resource unit to be used in a next D2D data channel transmission period. By doing so, although the UE does not receive SA for a next period, the UE is able to receive a D2D data channel.

Meanwhile, it is able to inform of whether an L1 ID (or SA ID) transmitted on an SA channel is changed in every SA transmission period. In particular, the L1 ID may or may not be changed in each SA transmission period. A UE transmitting SA informs of whether the L1 ID is changed via a data channel. If a network is capable of arranging the L1 ID well in an in coverage situation, it is not necessary to change the L1 ID used by a specific UE. Yet, in case of an in coverage situation in which the network does not manage the L1 ID or an out of coverage situation, the aforementioned configuration reflects that hopping of the L1 ID in every SA transmission period is efficient.

In the in coverage situation, an eNB can configure whether to hop the L1 ID to a D2D UE via RRC. In case of using a scheme of not hopping the L1 ID, an L1 ID to be used is designated. Or, when an SA grant, which permits SA transmission, is transmitted, it is able to designate whether a UE hops the L1 ID. When the SA grant is delivered, a specific L1 ID is given to indicate the L1 ID to be used in a non-hopping scheme without changing the L1 ID. Since the L1 ID is not given, it is able to indicate to use the L1 ID, which is determined according to time, by a predetermined AL ID.

Meanwhile, in order to map an AL ID of K [bits] to an L1 ID of L [bits], a method of using a gold sequence or a method of using tear off of an AL ID can be used. A length-K' Gold sequence where K'>K is used and an initial value of a sequence generator is initialized by an AL ID. By doing so, a Gold sequence c(n) different from each other according to the AL ID may occur. An L1 ID of L [bits] of $i^{th}$ time is determined by output bits outputted from c(i*L) to c((i+1)*L−1). According to a scheme of tearing off an AL ID, a part of the AL ID is tore off and it is used as an L1 ID. In particular, a part of L [bits] is tore off among the AL ID of K [bits] and it is used as an L1 ID of L [bits]. In this case, the tearing off part can change according to time. If the AL ID is given by a(i) where i=0, . . . , K−1, the L1 ID of L [bits] can be determined by output bits outputted from a(mod(i*L, K)) to c(mod((i+1)*L−1, K)).

Configurations of Devices for Embodiments of the Present Invention

Figure 8:
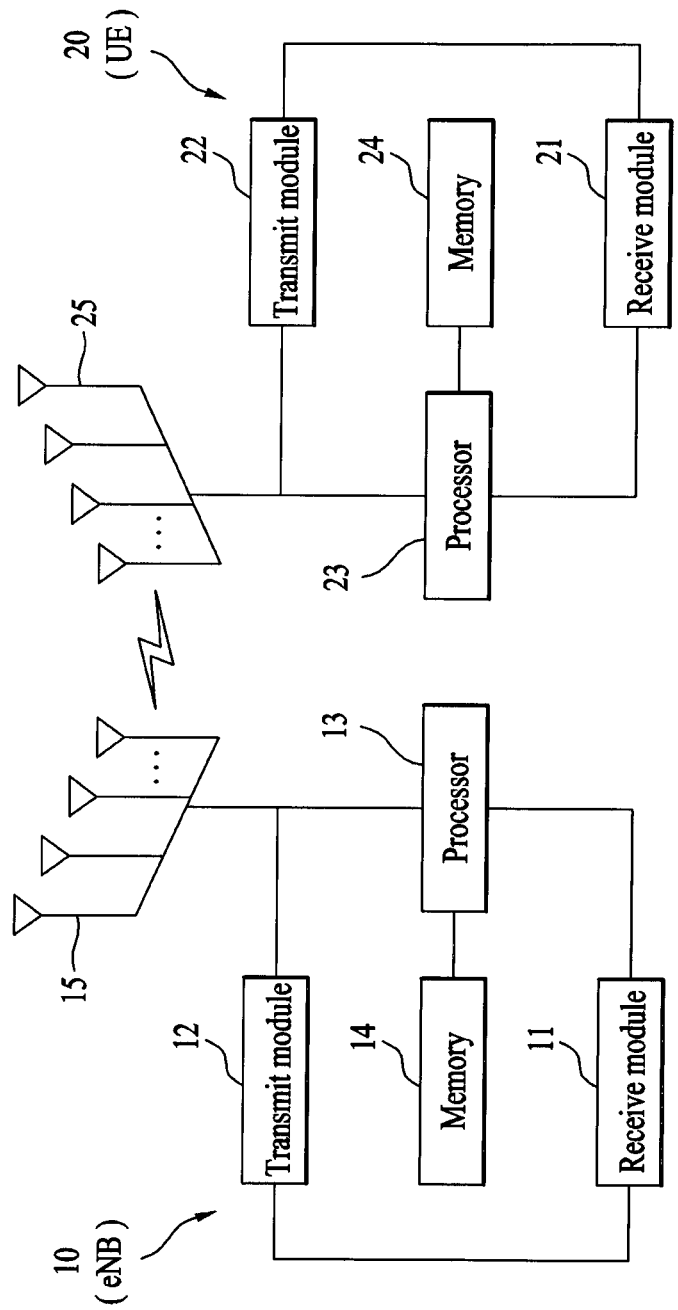
FIG. 8 is a diagram for a configuration of a transceiver.

FIG. 8 is a diagram illustrating configuration of a transmit point apparatus and a UE according to one embodiment of the present invention.

Referring to FIG. 8, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 8, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 8 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

The invention claimed is:

1. A method for transmitting a demodulation reference signal (DMRS), by a user equipment (UE) in a wireless communication system, the method comprising:
   receiving information related with a resource pool for device-to-device (D2D) transmission;
   determining a sequence for the DMRS based on an identifier (ID) and an index of a slot; and
   transmitting the DMRS based on the sequence,
   wherein the resource pool is composed of one or more subframes used for the D2D transmission,
   wherein the ID is used, by the UE within a D2D cluster, for performing group hopping for the sequence,
   wherein the one or more subframes are part of consecutive radio frames, and are discontinuous on time resources within the consecutive radio frames, and
   wherein the index of the slot is determined only within the one or more subframes included in the resource pool.

2. The method of claim 1, wherein the ID is received via scheduling assignment channel.

3. The method of claim 1, wherein the slot index is initialized at a start point of a D2D control channel transmission period.

4. The method of claim 1, wherein based on the DMRS being related to a D2D shared channel and the UE being related to an in-coverage UE, the ID is related to one designated by an eNB among an SSID (synchronization ID) and an L1 ID (layer 1 ID).

5. The method of claim 1, wherein if the DMRS is related to with a D2D shared channel and the UE is related to an out of coverage UE, the ID is related to one designated by a UE transmitting a synchronization signal among an SSID (synchronization ID) and an L1 ID (layer 1 ID).

6. The method of claim 5, wherein the L1 ID is received via a D2D control channel.

7. The method of claim 5, wherein based on the user equipment being related to the out of coverage UE, the L1 ID hops in every D2D control channel period.

8. The method of claim 1, wherein based on the DMRS being related to with a D2D control channel, the ID is related to an SSID (synchronization ID).

9. The method of claim 1, wherein based on group hopping being applied when a sequence group is determined, a group hopping pattern is determined according to the ID.

10. The method of claim 9, wherein the sequence group is determined by $u=(f_{gh}(n_s)+f_{ss})\mod 30$, wherein if the group hopping is not applied, $f_{gh}(n_s)$ is related to 0, wherein if the group hopping is applied, the $f_{gh}(n_s)$ is related to $(\Sigma_{i=0}^{7} c(8n_s+i)\cdot 2^i)\mod 30$, wherein c(i) is related to a scrambling sequence initialized by $$c_{init} = \left\lfloor \frac{N_{ID}}{30} \right\rfloor + \text{offset},$$

wherein $N_{ID}$ is related to the ID, wherein $f_{ss}$ corresponds to $(N_{ID}+\Delta_{SS})\mod 30$ and wherein $\Delta_{ss} \in \{0, 1, \ldots, 29\}$.

11. The method of claim 1, wherein based on a reference signal sequence generated by applying cyclic shift to the sequence being used for resource blocks equal to or less than 5, the sequence is related to a first sequence of a sequence group.

12. The method of claim 11, wherein based on the reference signal sequence being used for resource blocks equal to or greater than 6 and sequence hopping is used instead of group hopping, the sequence is selected according to the ID.

13. The method of claim 12, wherein the sequence is selected by a scrambling sequence c(i) initialized by $$c_{init} = \left\lfloor \frac{N_{ID}}{30} \right\rfloor \cdot 2^5 + (N_{ID} + \Delta_{ss}) \mod 30$$

and wherein $N_{ID}$ is related to the ID and $\Delta_{ss} \in \{0, 1, \ldots, 29\}$.

14. The method of claim 11, wherein the cyclic shift is determined by a scrambling sequence c(i) initialized by $$c_{init} = \left\lfloor \frac{N_{ID}}{30} \right\rfloor \cdot 2^5 + (N_{ID}) \mod 30$$

and wherein $N_{ID}$ is related to the ID.

15. The method of claim 1, wherein the ID is L1 ID (layer 1 ID), and the L1 ID is changed over time.

16. The method of claim 1, wherein the ID is an SSID (synchronization ID).

17. A user equipment (UE) for transmitting a demodulation reference signal (DMRS), the UE comprising:
a transceiver; and
a processor operatively connected to the transceiver and configured to:
receive information related with a resource pool for device-to-device (D2D) transmission,
determine a sequence for the DMRS based on an identifier (ID) and an index of a slot, and
transmit the DMRS based on the sequence,
wherein the resource pool is composed of one or more subframes used for the D2D transmission,
wherein the ID is used, by the UE within a D2D cluster, for performing group hopping for the sequence,
wherein the one or more subframes are part of consecutive radio frames, and are discontinuous on time resources within the consecutive radio frames, and
wherein the index of the slot is determined only within the one or more subframes included in the resource pool.

18. The UE of claim 17, wherein the ID is L1 ID (layer 1 ID), and the L1 ID is changed over time.

19. The UE of claim 17, wherein the ID is an SSID (synchronization ID).

* * * * *